May 10, 1966 G. W. STILLEY ETAL 3,250,246

THERMAL RESERVOIR TYPE WORK SUPPORT

Filed Nov. 25, 1964

INVENTORS
GEORGE W. STILLEY and
GEORGE R. NELSON
BY Chisholm and Spencer
ATTORNEYS – # United States Patent Office 3,250,246
Patented May 10, 1966

3,250,246
THERMAL RESERVOIR TYPE WORK SUPPORT
George W. Stilley, Freeport, and George R. Nelson, Tarentum, Pa., assignors to Pittsburgh Plate Glass Company, Pittsburgh, Pa., a corporation of Pennsylvania
Filed Nov. 25, 1964, Ser. No. 414,027
7 Claims. (Cl. 118—58)

This is a continuation-in-part of application Serial No. 32,000 of George W. Stilley and George R. Nelson, filed May 26, 1960, and now Patent No. 3,198,650, for Treating Glass Sheets.

This invention relates to Treating Glass Sheets. It specifically relates to an improvement in a skeletonized apparatus for supporting a horizontally disposed glass sheet slightly inwardly of its perimeter for thermal treatment such as required for bending and/or coating. During this latter treatment, the supported glass sheet is heated to an elevated temperature below the glass softening point but sufficient to hydrolize a metal salt composition to form a metal oxide coating upon contacting a heated surface of the supported glass sheet. The coated sheet is then cooled to below the glass annealing temperature range in such a manner that the stresses imparted to the glass during cooling are controlled.

The present invention eliminates the need for an expensive annealing lehr to control the rate at which the glass edge cools compared to that of its central portion. The present invention in its broadest aspect comprises an improvement in apparatus for producing bent or coated glass sheets wherein the sheet is conveyed through a hot atmosphere for the heating step required for bending or coating wherein the natural heating rate of the glass sheet periphery is retarded and the bent or coated glass sheet is conveyed through a relatively cool atmosphere with its forward peripheral portion shielded from stray currents of the relatively cool atmosphere while retarding the natural cooling rate of the glass sheet periphery during the cooling step. The cooling step is performed in an exposed atmosphere rather than within an expensive annealing lehr.

According to an illustrative embodiment of the present invention, a horizontal ledge member is attached to and surrounds an elongated rail forming the skeletonized support structure. The horizontal ledge member is attached at its laterally inner edge to the elongated rail and extends laterally outwardly from the rail in a plane spaced below the upper edge surface of the edgewise disposed rail, which upper edge surface defines a support plane for the bent and/or coated glass sheet. The horizontal ledge member extends longitudinally the entire length of the elongated rail. A vertical fence member is attached to the horizontal ledge member outwardly of the elongated rail and extends upwardly therefrom.

The vertical fence member extends longitudinally in spaced relation to the rail for a portion only of the length of the elongated rail. This portion is sufficient to encompass only the portion of the perimeter of the skeletonized support structure that supports one longitudinal edge and the adjacent portions of the side edges extending from the extremities of the one longitudinal edge.

In an illustrative embodiment of the present invention, the vertical fence member has an upper edge that is at a higher elevation than the glass sheet support plane.

The peripheral mass of metal adjacent to but spaced from the periphery of the glass sheet provided by the horizontal ledge and vertical fence members has sufficient thermal capacity to moderate the rate of cooling of the glass sheet edge, which would otherwise cool more rapidly than the central region of the glass in the absence of the peripheral mass of metal. The provision of the simple peripheral metal structure on the skeleton support structure furnishes a relatively inexpensive apparatus that tends to equalize the rate of cooling of the edges and the central portion of the supported glass sheet, thus reducing breakage due to thermal shock resulting from steep thermal gradients between the edge and the remainder of the sheet as the glass sheet cools immediately following a bending and/or coating operation. Previous to the present invention, it was considered necessary to use expensive lehrs within which the glass was cooled from above its annealing range to below its annealing range to control the cooling rate of the glass sheet through the annealing range.

The importance of the present invention will become obvious after studying the description of an illustrative embodiment of the present invention which follows.

In the illustrative embodiment of the present invention, wherein like reference numbers apply to like structural elements, FIG. 1 is a plan view of a skeletonized glass supporting member conforming to the present invention;

Figure 1:
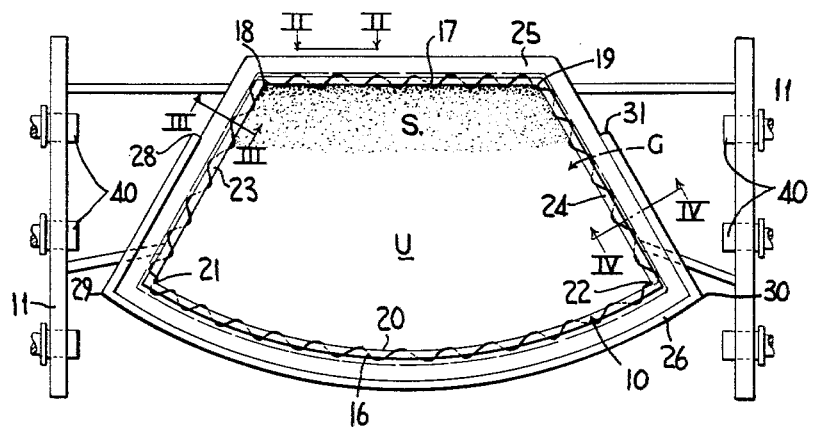
Figure 2:
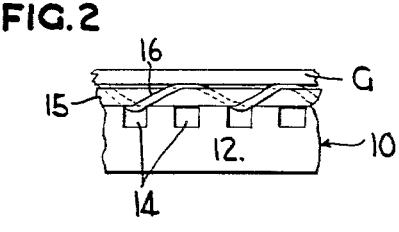
FIG. 2 is a fragmentary elevation taken along the lines II—II of FIG. 1.
Figure 3:
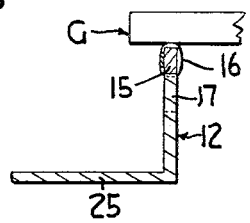
FIG. 3 is a fragmentary sectional view taken along the lines III—III of FIG. 1.
Figure 4:
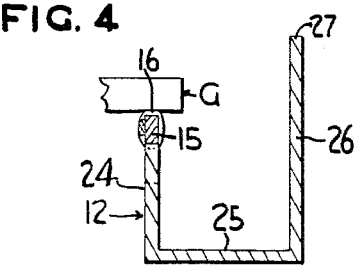
FIG. 4 is a sectional view taken along the lines IV—IV of FIG. 1.

In the drawings, a partially coated glass sheet G is shown with a shaded area S and an unshaded area U. This glass sheet is supported on a horizontally disposed metal frame 10 of skeletonized configuration, attached to a pair of parallel rails 11. Each rail is located beyond a longitudinal extremity of the frame 10 and extends in a direction transversely thereof. The frame comprises an edgewise disposed, elongated rail 12 having apertures 14 therein and including a thin metal strip 15 attached to its upper extremities. Metal strip 15 has a flat upper edge to provide a horizontal plane of support for a flat glass sheet. Of course, the frame can comprise one or more rails extending in end-to-end relationship, and each rail can be unitary structure rather than the composite structure illustrated.

A ribbon 16 of heat resistant fabric, such as fiber glass or asbestos, is looped between the apertures 14. Its upper runs resting on the top edge of metal strip 15 provide support means for the glass sheet in vertically spaced relation to the upper edge surface of metal strip 15. The loops 16 support the glass sheet G around its marginal portion slightly inwardly of its perimeter as shown in FIGS. 1, 3, 4, and 6.

Rail 12 has a longitudinal side portion 17 extending between corners 18 and 19, a longitudinal side portion 20 extending between corners 21 and 22 and transverse end portions 23 and 24. Transverse end portion 23 interconnects corners 18 and 21, while transverse end portion 24 interconnects corners 19 and 22. Longitudinal side portion 17 supports the glass sheet adjacent its longitudinal edge bounding an area to be coated or shaded. Transverse end portions 23 and 24 support the glass sheet adjacent its side edges. Longitudinal side portion 20 supports the glass adjacent its longitudinal edge bounding its uncoated area U.

A horizontal ledge member 25 is attached at its laterally inner edge to the bottom of the edgewise disposed elongated rail 12 and extends laterally outwardly from the rail in a plane spaced below the plane in which the ribbon 16 provides the glass support. Horizontal ledge member 25 extends longitudinally about the entire circumference of rail 12.

A vertical fence member 26 is attached to the outer lateral edge of the horizontal ledge member 25 and extends upwardly therefrom in spaced relation to the glass sheet support rail 12 so that its upper edge 27 is at a higher elevation than that occupied by the ribbon 16 atop support rail 12.

The length of vertical fence member 26 in the illustrative embodiment is less than that of horizontal ledge member 25. It merely extends continuously from one longitudinal extremity 28 spaced from corner 18 in a direction parallel to rail portion 23 to corner 29 outside rail corner 21. Vertical fence member 26 continues to extend longitudinally parallel to and spaced from rail portion 20 to corner 30 outside rail corner 22. From here, it continues parallel to and spaced from rail portion 24 to its other longitudinal extremity 31 spaced from rail corner 19. As clearly seen in FIG. 1, longitudinal extremities 28 and 31 are located in a vertical plane aligned with the boundary between the coated areas S and the uncoated area U of the supported glass sheet. The vertical fence member 26 is spaced from the rail portions 20, 23, and 24 a greater distance than the distance that the glass sheet edge overlaps its support surface 20. Thus, the vertical fence member 26 encompasses only the uncoated area U of the supported glass sheet.

An illustrative example of apparatus for forming a band of coating approximately one foot wide comprises a support rail ⅛ inch thick and 2 inches deep, a horizontal ledge member ¹⁄₃₂ inch thick and 2½ inches wide and a vertical member ¹⁄₃₂ inch thick and 2½ inches high. Such a construction has been used to coat a band of metal oxide on tinted plate glass or tinted sheet glass panels about ¼ inch thick. Such dimensions insure that the vertical wall member is spaced outwardly, yet close enough to the rail to have its thermal capacity and that of the horizontal ledge member moderate the temperature changes in the glass sheet perimeter resulting from the thermal treatment involved in the coating operation sufficiently to tend to equalize the perimeter temperature and that of the central portion of the supported glass sheet.

Typical metal oxide films suitable for use with the present invention are disclosed in U.S. Patent No. 2,688,565 to Raymond and in U.S. Patent No. 2,564,708 to Mochel. A typical tinted glass consists essentially of the following analyzed chemical composition:

| Ingredient: | Parts by weight, percent |
| --- | --- |
| $SiO_2$ | 71.5 |
| $Na_2O$ | 13.1 |
| $CaO$ | 11.7 |
| $MgO$ | 2.4 |
| $Na_2SO_4$ | 0.5 |
| $NaCl$ | 0.1 |
| $Fe_2O_3$ | 0.5 |
| $Al_2O_3$ | 0.2 |

By encompassing the glass sheet edge in a web-like construction of metal formed by the horizontal ledge member 25 and the vertical wall member 26, the thermal capacity of the metal retards the heating rate of the perimeter of the glass sheet during the heating portion of the cycle necessary to heat and coat the glass. The metal web acts similarly to retard the cooling rate of the glass sheet edge during cooling. This construction permits the glass sheet to heat and cool at a more nearly uniform rate throughout its extent than its natural rate without requiring an expensive lehr to control the cooling.

Figure 5:
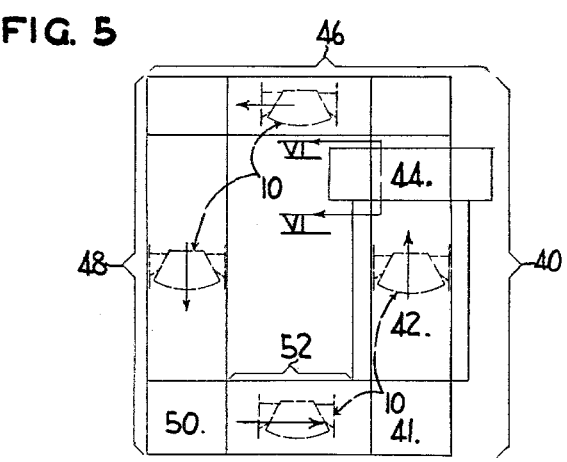
FIG. 5 is a plan view of a conveyor system for treating glass sheets for which the novel skeleton support structure is especially adapted.
Figure 6:
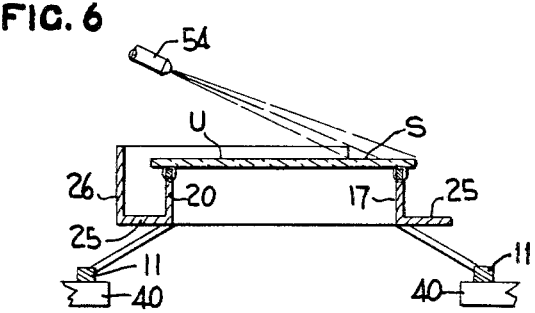
FIG. 6 is a schematic sectional view along the lines VI—VI of FIG. 5, showing a typical spraying operation in which a glass sheet is supported on said mold.

FIGS. 5 and 6 illustrate how the present apparatus is employed for heating a succession of glass sheets to film forming temperature for coating the heated sheets with a metal oxide film in the form of a band and cooling the sheets with minimum loss due to chill cracking. It uses a conveyor system comprising a primary conveyor 40 starting at a loading station 41 and extending through a tunnel-like furnace 42 and a spray station 44 and terminating at a first transfer conveyor 46. The latter extends between the end of the primary conveyor 40 and the beginning of a return conveyor 48. An unloading station 50 is located at the end of the return conveyor 48. A second transfer conveyor 52 extends between unloading station 60 and loading station 41. A spray gun 54 (FIG. 6) is reciprocated along a path transverse to the longitudinal axis of primary conveyor 40 and may be constructed as depicted in U.S. Patent No. 2,899,929 to Monroe.

A flat glass sheet G is mounted on a support frame 10 at loading station 41 with its perimeter extending ⅛ inch to ¼ inch beyond the perimeter of rail 12. The support frame 10 is oriented so that its rail portion 17 is the leading end of the frame as it is conveyed through the furnace 42 and the spray station 44 by primary conveyor 40. The glass sheet G is heated to film forming temperature as it traverses the furnace 42. Then, it is positioned in proper alignment with the reciprocating spray gun 54 in the spray station 44.

The spray gun is oriented to direct a spray toward the leading edge of the glass sheet in the direction of rail portion 17 of support frame 10. The leading portion of the glass sheet corresponding to the area S to be coated is not encompassed by any portion of the vertical member 26 during spraying. This orientation avoids any chance of spray rebounding onto the surface of the glass sheet and causing spots or areas to form, thus spoiling the uniform appearance of the film.

After spraying, the coated sheet is removed from the spray station 44 and immediately transferred laterally on the first transfer conveyor 46 to the return conveyor 48. The transfer conveyors 46 and 52 and the return conveyor 48 are open and exposed to the ambient atmosphere and stray currents within the building housing the conveyor system. Therefore, the possibility for chill cracking the glass sheet during its cooling step is quite likely. Heretofore, this possibility has been avoided by employing an expensive annealing lehr within which the cooling rate for the glass sheet was carefully controlled. The apparatus of the present invention provides a simple inexpensive replacement for the expensive annealing lehr of the prior art by having the vertical wall member 26 encompass the uncoated area U of the glass sheet. This enables the vertical wall member 26 to serve to shield the leading edge and the sides of the glass sheet as it moves along the return conveyor 48 in a direction opposite that taken when the sheet passes through the primary conveyor 40. The cooled sheet is removed from the support structure 10 at the unloading station 50. The unloaded support structure 10 is conveyed sidewise along the second transfer conveyor 52 to the loading station 41 where a new glass sheet is loaded onto the skeleton support structure 10 with its perimeter extending ⅛ inch to ¼ inch beyond the perimeter of rail 12 as before, and the process is repeated.

The specific description of an embodiment of the present invention is for the purpose of illustration rather than limitation, as many alternative embodiments may become obvious to the reader in the light of the present disclosure. For example, the glass supporting apparatus disclosed hereinabove is suitable for supporting one or more glass sheets during cooling in an exposed atmosphere immediately or remotely following a heating operation for the purpose of fabrication of glass to other articles of commerce than partly coated flat glass, such as bent glass sheets, bent coated glass sheets and flat or bent uncoated glass sheets. These alternatives are intended to be encompassed within the claimed subject matter which follows.

What is claimed is:

1. In apparatus for supporting a glass sheet for thermal treatment during which the supported glass sheet is heated to an elevated temperature sufficient to hydrolize a metal salt composition to form a metal oxide coating upon contacting the heated surface of the glass sheet, said apparatus comprising an elongated rail extending circumferentially about said apparatus and disposed edgewise, said support comprising the upper edge surface said rail for forming a support for the marginal portion of a glass sheet slightly inwardly of its perimeter, the improvement comprising a horizontal ledge member attached at its laterally inner edge to said elongated rail and extending laterally outwardly from said rail in a plane spaced below said upper edge surface, said horizontal ledge member extending longitudinally the entire length of said elongated rail, and a vertical wall member spaced outwardly from said rail a distance sufficient to provide clearance for said glass sheet perimeter, yet close enough to said rail to have the thermal capacity of said vertical wall member and that of said horizontal ledge member moderate the temeprature changes in said perimeter resulting from said thermal treatment, said vertical wall member being attached to said horizontal ledge member outwardly of said elongated rail and extending upwardly therefrom, said vertical wall member extending longitudinally in spaced relation to said rail and provided with an upper edge located in a higher horizontal plane than that occupied by said upper rail edge, said vertical wall member extending a portion only of the length of said horizontal ledge member but of sufficient extent to cooperate with said horizontal ledge member to provide a heat reservoir in the vicinity of said glass sheet perimeter.

2. The improvement according to claim 1, wherein said apparatus is adapted for use in applying a band of metal oxide along an elongated area of said supported glass sheet including only its perimeter in the vicinity of a rail portion interconnecting two adjacent rail corners and extending laterally inwardly from said perimeter, wherein said vertical wall member extends longitudinally a length sufficient to encompass only the remainder of the perimeter excluding said elongated area.

3. In apparatus for supporting a glass sheet for thermal treatment comprising an elongated rail extending circumferentially about said apparatus and enclosing an area similar in outline to and slightly smaller than the outline of the supported glass sheet, said glass sheet support comprising the upper edge surface of said rail, and reinforcing means connected to said rail and located outwardly of and adjacent to said rail, the improvement comprising a vertical wall member extending in spaced relation to said rail and provided with an upper edge located in a higher horizontal plane than that occupied by said glass sheet support means, said upper edge extending for a portion only of the length of said rail, a horizontal ledge member at least coextensive in length with said vertical wall member interconnecting said rail and said vertical wall member in a plane spaced below the upper edge surface of said rail, said vertical wall member being spaced outwardly from said rail a distance sufficient to provide clearance for the outline of the supported glass sheet, yet close enough to said rail to have the thermal capacity of said vertical wall member and that of said horizontal ledge member moderate the changes in temperature at the edge portion of said glass sheet adjacent thereto resulting from said thermal treatment so as to tend to equalize the temperature of said edge portion with that of the central portion of said supported glass sheet, said vertical wall member being of sufficient extent to cooperate with said horizontal ledge member to provide a heat reservoir in the vicinity of the outline of said supported glass sheet.

4. Apparatus for treating glass sheets including closed cycle conveyor system comprising a primary conveyor, a first transfer conveyor, a return conveyor traversing an open area and a second transfer conveyor; a tunnel-like furnace and a spray station traversed in succession by said primary conveyor, a plurality of glass sheet support structures conveyed through said conveyor system, each glass sheet support structure comprising an elongated edgewise disposed rail for supporting a glass sheet adjacent its periphery, said support comprising the upper edge surface of said rail, a horizontal ledge member attached at its laterally inner edge to said edgewise disposed rail and extending laterally outwardly from said rail in a plane below said upper edge surface, said horizontal ledge member extending longitudinally the entire length of said rail, and a vertical wall member spaced outwardly from said rail a distance sufficient to provide clearance for said glass sheet perimeter, yet close enough to said rail to have the thermal capacity of said vertical wall member and that of said horizontal ledge member moderate the temperature changes in said perimeter resulting from said thermal treatment, said vertical wall member being attached to said horizontal ledge member outwardly of said elongated rail, extending upwardly therefrom and provided with an upper edge located in a higher horizontal plane than that occupied by said upper rail edge, said vertical wall member extending longitudinally in spaced relation to said rail for a portion only of the length of said horizontal ledge member, said vertical wall member embracing the rearward and rear side portions only of said rail when said glass sheet support structure is properly oriented for movement through said primary conveyor.

5. Apparatus as in claim 4, wherein said spray station comprises spray means oriented to direct a spray toward the leading edge of a supported glass sheet in the direction of the leading side portion of each of said glass sheet support structures occupying said spray station.

6. Apparatus for thermally treating glass sheets comprising a first conveyor section traversing an enclosed heated area, a second conveyor section traversing an open area, a plurality of glass sheet support structures, means for conveying glass sheets on said glass sheet support structures in succession along said first conveyor section and then said second conveyor section, each glass sheet support structure comprising an elongated edgewise disposed rail for supporting a glass sheet adjacent its periphery, said support comprising the upper edge surface of said rail, a vertical wall member extending longitudinally in outwardly spaced relation to said rail for a portion only of the length of said rail and embracing only the leading side and the front side portions of said elongated rail when said glass sheet support structure is properly oriented for movement through said open area, a horizontal ledge member at least coextensive in length with said vertical wall member interconnecting said rail and said vertical wall member in a plane spaced below the upper edge surface of said rail, said vertical wall member being spaced outwardly from said rail a distance sufficient to provide clearance for said glass sheet perimeter, yet close enough to said rail to have the thermal capacity of said vertical wall member and that of said horizontal ledge member moderate the temperature changes in said perimeter resulting from said thermal treatment, said vertical wall member being provided with an upper edge located in a higher horizontal plane than that occupied by said upper rail edge, said vertical wall member being of sufficient extent to cooperate with said horizontal ledge member to provide a heat reservoir in the vicinity of said glass sheet periphery.

7. In apparatus for supporting a glass sheet for thermal treatment during which the supported glass sheet is heated to an elevated temperature and subsequently cooled, said apparatus comprising an elongated rail extending circumferentially about said apparatus and disposed edgewise, said elongated rail comprising a pair of longitudinal side portions and a pair of transverse end portions, the upper edge surface of said rail forming a support for the marginal portion of a glass sheet slightly inward of its perimeter, the improvement comprising a vertical wall member in outwardly spaced relation to at least the entire length of one of said longitudinal side portions of said elongated rail, a horizontal ledge member at least coextensive in length with said vertical wall member interconnecting said rail and said vertical wall member in a plane spaced below the upper edge surface of said rail, said vertical wall member being spaced outwardly from said rail a distance sufficient to provide clearance for said glass sheet perimeter, yet close enough to said rail to have the thermal capacity of said vertical wall member and that of said horizontal ledge member moderate the temperature changes in said perimeter resulting from said thermal treatment, said vertical wall member being provided with an upper edge located in a higher horizontal plane and a lower edge located in a lower horizontal plane than that occupied by said upper rail edge, said vertical wall member being of sufficient extent to cooperate with said horizontal ledge member to provide a heat reservoir in the vicinity of said glass sheet perimeter.

No references cited.

MORRIS KAPLAN, *Primary Examiner.*